United States Patent [19]
Knight, IV et al.

[11] 3,801,126
[45] Apr. 2, 1974

[54] OCCUPANT RESTRAINT SYSTEM

[75] Inventors: John W. Knight, IV, Mount Clemens; Carl M. Savage, Jr., Milford, both of Mich.

[73] Assignee: General Motors Corporation, Detroit, Mich.

[22] Filed: May 19, 1972

[21] Appl. No.: 255,026

[52] U.S. Cl............................ 280/150 AB, 180/90
[51] Int. Cl.............................................. B60r 21/02
[58] Field of Search ..... 280/150 AB, 150 B; 180/90

[56] References Cited
UNITED STATES PATENTS

| | | | |
|---|---|---|---|
| 3,413,013 | 11/1968 | Wissing et al. | 280/150 AB |
| 3,473,824 | 10/1969 | Carey et al. | 280/150 AB |
| 2,755,125 | 7/1956 | Hodges | 280/150 AB |
| 3,642,303 | 2/1972 | Irish | 280/150 AB |
| 3,632,136 | 1/1972 | Foltz | 280/150 AB |
| 3,638,755 | 2/1972 | Sack | 280/150 AB |
| 3,527,475 | 9/1970 | Carey et al. | 280/150 AB |
| 2,850,291 | 9/1958 | Ziccardi | 280/150 AB |

FOREIGN PATENTS OR APPLICATIONS

| | | | |
|---|---|---|---|
| 609,624 | 9/1960 | Italy | 280/150 AB |

*Primary Examiner*—David Schonberg
*Assistant Examiner*—Jack D. Rubenstein
*Attorney, Agent, or Firm*—Herbert Furman

[57] ABSTRACT

An occupant restraint system for a vehicle body includes a manifold provided by an elongated shallow trough having flanged walls which define an opening in general alignment with an elongated opening in the upper portion of the instrument panel adjacent the windshield. An oval-shape slotted diffuser seats on the base wall of the trough and is bolted through the trough to brackets on the cowl structure of the body to mount the trough and diffuser in place. One end of the diffuser is closed and the other end communicates with a source of pressure fluid such as a pressure vessel or gas generator. An occupant restraint cushion is of T cross section and includes an elongated tapered umbilical portion having one open side thereof receiving the opening of the trough and secured to the flanged walls thereof. An elongated pillow portion of the cushion communicates with the other open side of the umbilical portion and extends transversely of the umbilical portion. The pillow portion extends peripherally beyond the umbilical portion on all sides. When the cushion is in stored position, it is rolled upon itself and received within the trough. A cover for the opening in the instrument panel has flanges releasably clamped between the flanged walls of the trough and the upper portion of the instrument panel. One or more valves in the walls of the trough close openings which communicate with the interior of the vehicle or with ambient atmosphere. The trough brackets, additional brackets from the cowl structure, and tie bars support a lower knee panel which extends transversely of the vehicle underneath the instrument panel. The knee panel includes a perforated steel base covered with semi-rigid resilient material and an outer decorative covering.

When the source of pressure fluid is communicated with the diffuser, the diffuser expands from oval shape toward a round shape and relocates the slots during such change in shape. The pressure fluid flows from the diffuser into the trough and then into the cushion to inflate the cushion. The umbilical portion is projected rearwardly and generally upwardly of the body through the opening in the upper portion of the instrument panel and is located between the windshield and such upper portion. The pillow portion is erected generally vertically of the body rearwardly of the frontal portion of the instrument panel and of the steering wheel. The tapered umbilical portion locates the pillow portion angularly of the frontal portion of the instrument panel so that its right-hand side is located adjacent the right-hand side of the frontal portion of the instrument panel and its left-hand side clears the steering wheel.

5 Claims, 8 Drawing Figures

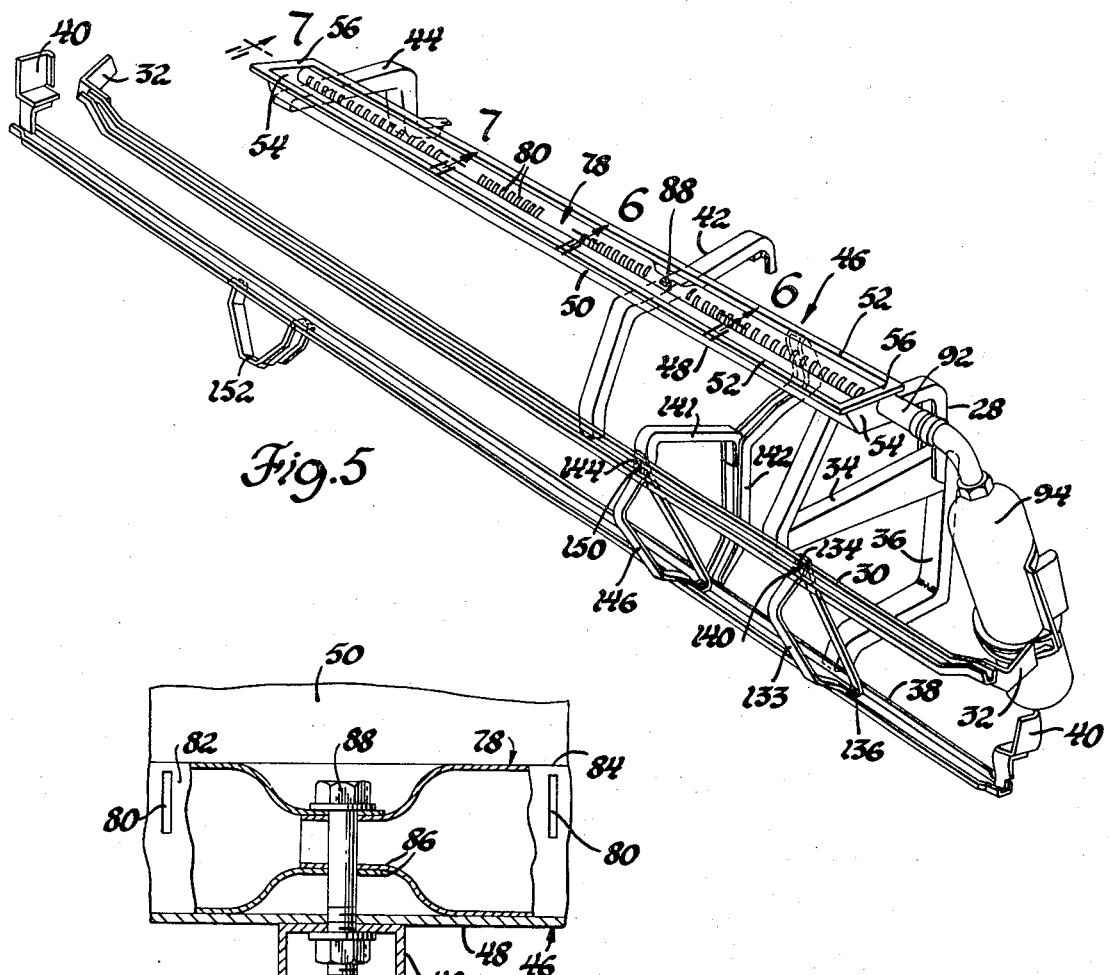
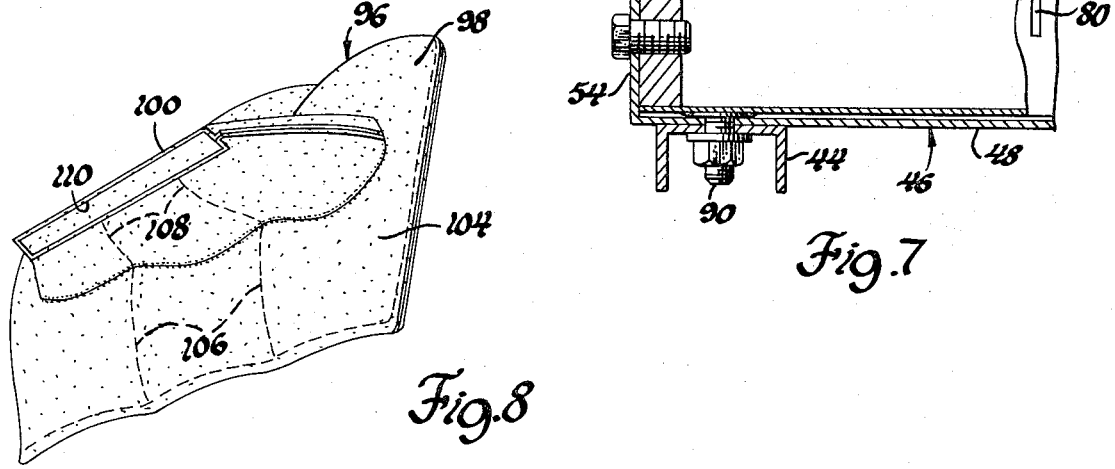

OCCUPANT RESTRAINT SYSTEM

This invention relates generally to vehicle body occupant restraint systems and more particularly to such a system which includes a cushion deployed from the upper portion of a vehicle body instrument panel for engagement by the torsos and heads of the driver and other front seat occupants, and an energy absorbing knee panel for engagement by the knees of such occupants to properly position the occupants for engagement with the cushion.

Vehicle body occupant restraint cushions which are deployed from the instrument panel are known in the art. Such cushions may be deployed upwardly from the upper portion of the instrument panel over the windshield, or may be deployed rearwardly of the body from the lip or frontal portion of the instrument panel. It is also known to project cushions rearwardly of the body and over the steering wheel as well as to mount restraint cushions within the hub of the steering wheel.

In the system of this invention, the occupant restraint cushion is generally of T shape and includes an elongated tapered umbilical portion and an elongated pillow portion extending transversely of the umbilical portion. The one open side of the umbilical portion is received within an opening in the upper portion of the instrument panel and mounted to the body within the opening for communication with a source of pressure fluid. The instrument panel opening is located adjacent the juncture of the instrument panel and the windshield. The umbilical portion extends rearwardly of the upper portion of the instrument panel between the upper portion and the windshield. The other side of the umbilical portion is angular to the one side to taper this portion transversely of the body. An elongated pillow portion of the cushion extends transversely of the umbilical portion rearwardly of the frontal portion of the instrument panel and of the steering wheel. Due to the tapered shape of the umbilical portion, the pillow portion is located angularly of the body and of the instrument panel. This permits the pillow portion to be located immediately adjacent to the instrument panel on the right-hand side of the body as well as immediately adjacent to the steering wheel on the left-hand side of the body. The pillow portion extends peripherally beyond the umbilical portion on all sides thereof so as to extend between the front doors of the vehicle, up to the header of the vehicle and generally down to the abdominal area of the front seat occupants. The cushion is stored within the upper portion of the instrument panel below the opening therein, and a cover closes the instrument panel opening and provides a continuation of the upper surface of the instrument panel. Preferably, the cushion is rolled downwardly when stored, although it can be folded.

The instrument panel includes a lower portion or knee panel which is located for engagement by the knees of the front seat occupants to control movement of such occupants relative to the front seat and aid in properly positioning the occupants with respect to the pillow portion of the cushion.

One object of this invention is to provide an improved vehicle body occupant restraint system having a cushion of generally T-shape which includes an elongated umbilical portion adapted to be mounted on a transverse structural portion of the vehicle body and communicated with a source of pressure fluid, and a pillow portion extending transversely of the umbilical portion and between the structural portion and seated vehicle occupants. Another object of this invention is to provide such a cushion wherein the umbilical portion is tapered longitudinally thereof to locate the pillow portion angularly to the structural portion of the body.

A further object of this invention is to provide an improved vehicle body occupant restraint system having a cushion of generally T shape which includes an elongated umbilical portion adapted to be mounted within the upper portion of the instrument panel of the body adjacent the lower edge of the windshield and projecting rearwardly of the body between such upper portion and the windshield, and a pillow portion extending transversely of the umbilical portion and peripherally therebeyond rearwardly of the frontal portion of the instrument panel and the steering wheel for engagement by front seat occupants. Yet another object of this invention is to provide an improved vehicle body occupant restraint system which includes an occupant-engageable cushion portion located intermediate the front seat occupants and both the frontal portion of the vehicle body instrument panel and the steering wheel thereof, the cushion portion being located angularly of the body transversely thereof and above a knee panel engageable by the knees of the front seat occupants to limit movement of such occupants forwardly of the body and properly position such occupants for engagement of the heads and torsos thereof with the cushion portion.

These and other objects of the invention will be readily apparent from the following specification and drawings wherein:

FIG. 5 is a view similar to FIG. 1 but with parts removed to show the details of the manifold, diffuser, and bracket structure;

FIG. 6 is an enlarged sectional view taken generally along the plane indicated by line 6—6 of FIG. 5;

FIG. 7 is an enlarged sectional view taken generally along line 7—7 of FIG. 5; and FIG. 8 is a perspective view of the inflated cushion removed from the body.

Figure 1:
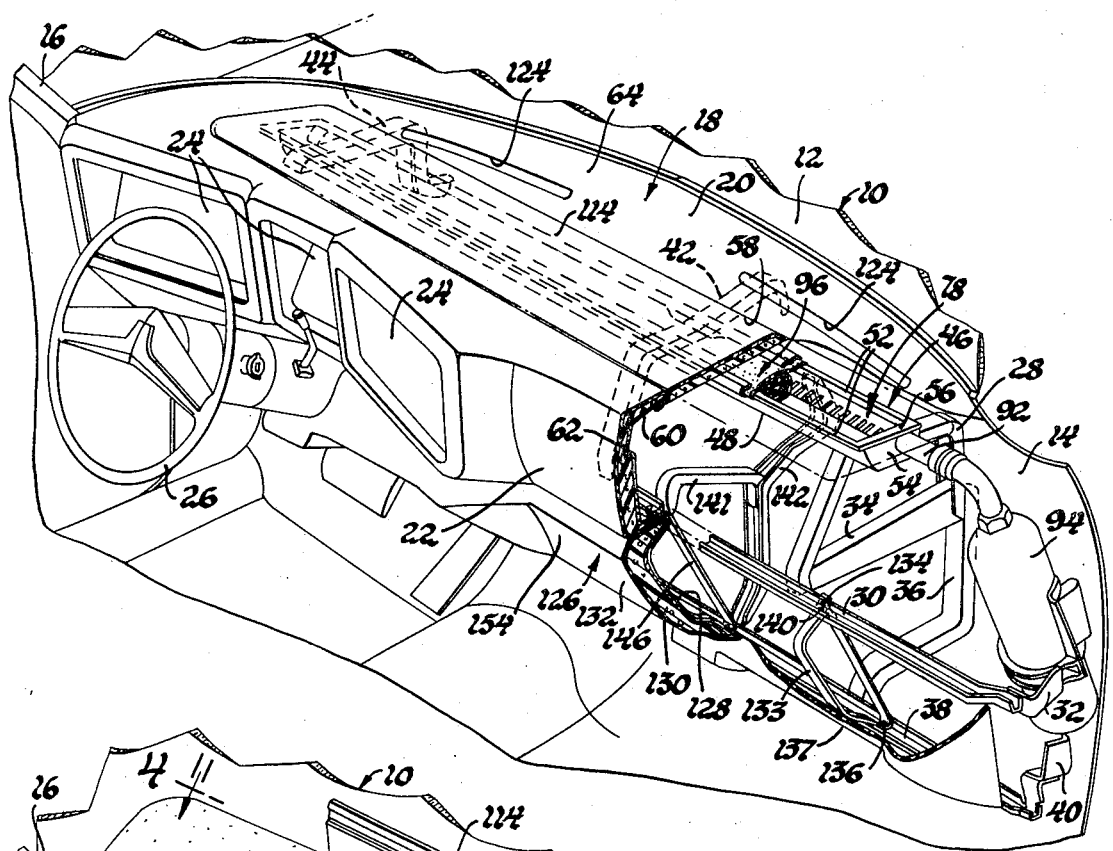
FIG. 1 is a partial perspective view of a vehicle body embodying an occupant restraint system according to this invention, with the cushion being shown uninflated.
Figure 3:
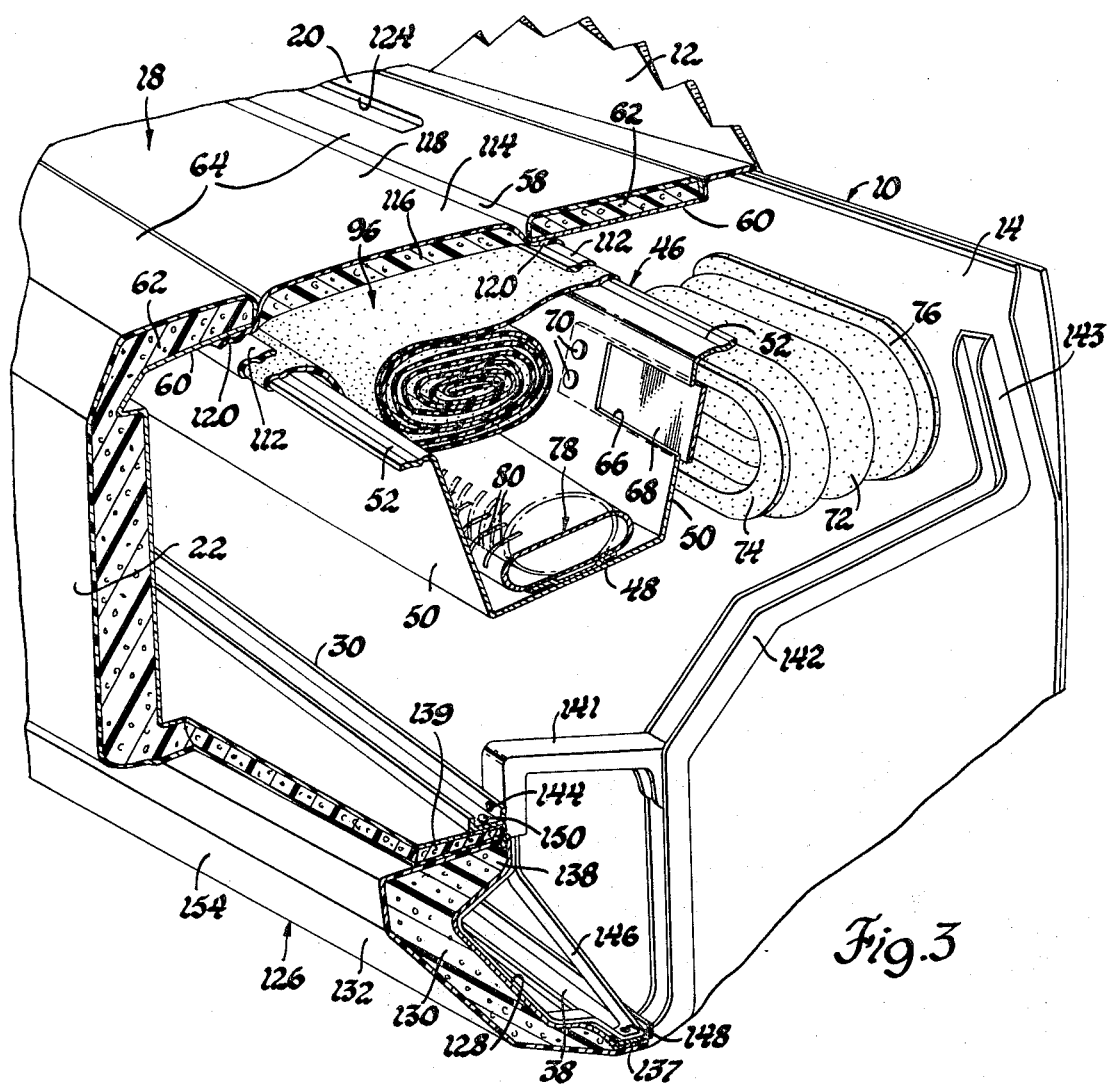
FIG. 3 is an enlarged view of a portion of FIG. 1.

Referring now particularly to FIGS. 1 and 3 of the drawings, a vehicle body designated generally 10 includes a conventional windshield 12 which is conventionally curved transversely of the body. The lower edge of the windshield is conventionally secured to the firewall or cowl structure 14 of the body and the side edges and upper edge of the windshield are likewise respectively secured to the front door or A pillars 16 of the body, and to the windshield header, not shown.

An instrument panel 18 of conventional structure includes an upper panel portion 20 and a frontal portion 22. The frontal portion includes suitable provisions for housing the instruments 24 of the vehicle which are conventionally grouped around the steering wheel 26 of the vehicle.

An inverted generally U-shaped bracket 28 of channel cross section has its forward leg welded to the cowl structure 14 and its rear leg welded to the rear leg of a conventional channel cross section tie bar 30 which extends transversely of the body and has its ends conventionally secured to the hinge pillar portions, not shown, of pillars 16 by end brackets 32. A cross bracket 34 extends between the legs of the bracket 28 and a channel cross section offset bracket 36 has its forward upper end welded to the forward leg of bracket 28 and its rear lower end welded to the rear leg of a channel cross section tie bar 38 which extends transversely of the body and has its ends conventionally secured to the hinge pillar portions, not shown, of the pillars 16 by end brackets 40. An inverted U-shaped bracket 42 of channel cross section has its forward leg welded to the cowl structure 14 and its rear leg welded to the rear leg of tie bar 30. A generally L-shaped bracket 44 of channel cross section has its shorter leg welded to the cowl structure 14 and its longer leg extending rearwardly of the body. As shown in FIGS. 3 and 5, an upwardly opening trough or manifold 46 includes a base wall 48, a pair of diverging angularly related side walls 50, each of which is flanged at 52, and a pair of end walls 54, each of which is flanged at 56. The base wall 48 of the manifold seats on the base legs of the brackets 28 and 42 and the longer leg of bracket 44 to thereby locate the manifold within the instrument panel 18. The manifold opens upwardly through a generally coextensive opening 58 in the portion 20 of the instrument panel. The opening 58 is defined by an opening in the metal base 60 of the instrument panel, the foam pad 62 covering the portion 20, and is generally of rectangular shape. The outer decorative covering 64 of the foam pad 62 is wrapped over the foam pad and secured to the base 60 inwardly of the opening as shown in FIG. 3. Although the manifold 46 is shown as having a planar base wall 48, it should be noted that it may be slightly curved transversely of the vehicle body, longitudinally of the vehicle body, or both.

The forward side wall 50 of the manifold includes three spaced rectangular openings 66, one of which is shown in FIG. 3. A valve member 68 of spring steel has one end riveted to the wall 50 at 70 to one side of a respective opening 66 and is deflectable outwardly of the opening or forwardly of the body to provide a reed-type valve as will be further described. A bellows 72 has one flanged end 74 conventionally secured to the wall 50 around each opening 66 and the other flanged end 76 conventionally secured to the cowl structure 14 around an opening, not shown, either through the cowl structure to the engine compartment of the vehicle, or to the plenum of the vehicle which may be formed as part of the cowl structure to communicate the manifold with the ambient atmosphere. Alternatively, the openings 66 and valve members 68 may be provided in either the base wall 48 of the manifold or the other wall 50 to communicate the manifold with the interior of the body.

A diffuser 78, FIGS. 1, 3 and 5, seats on the base wall 48 of the manifold. The diffuser is generally of flattened oval shape and includes a plurality of groups of slots 80, FIG. 5. As shown in FIGS. 5 and 6, the diffuser includes sections 82 and 84 having further flattened interfitting ends 86 which are bolted at 88 to each other and to the base leg of the bracket 42 through a slot in the base wall 48 of the manifold. Other bolts 90, FIG. 7, having their flattened heads secured to the diffuser extend through slots in the base wall 48 and are bolted to the base leg of the bracket 28 and the long leg of the bracket 44. The bolts 88 and 90 thus mount the diffuser 78 and manifold on the body.

The diffuser 78 extends the full length of the manifold and has its circular cross section right-hand end portion 92 extending outwardly through the right-hand side wall 54 for communication with a pressure vessel or gas generator 94 which is housed within the side wall structure of the body forwardly of the pillar 16. The gas generator provides a source of pressure fluid which is released upon command to the diffuser. The signal for release may be conventionally obtained in a number of different manners through suitable inertial and/or deformation sensors as is well known in the art.

The left-hand end of the diffuser is closed by an oval wall, not shown, which is releasably secured to the left-hand wall 54 of manifold 46. The diffuser 78 is thus anchored along its length so that it cannot twist or sinuously deform when it receives pressure fluid from the gas generator 94 but can only expand vertically toward a circular shape, as will be explained.

Figure 2:
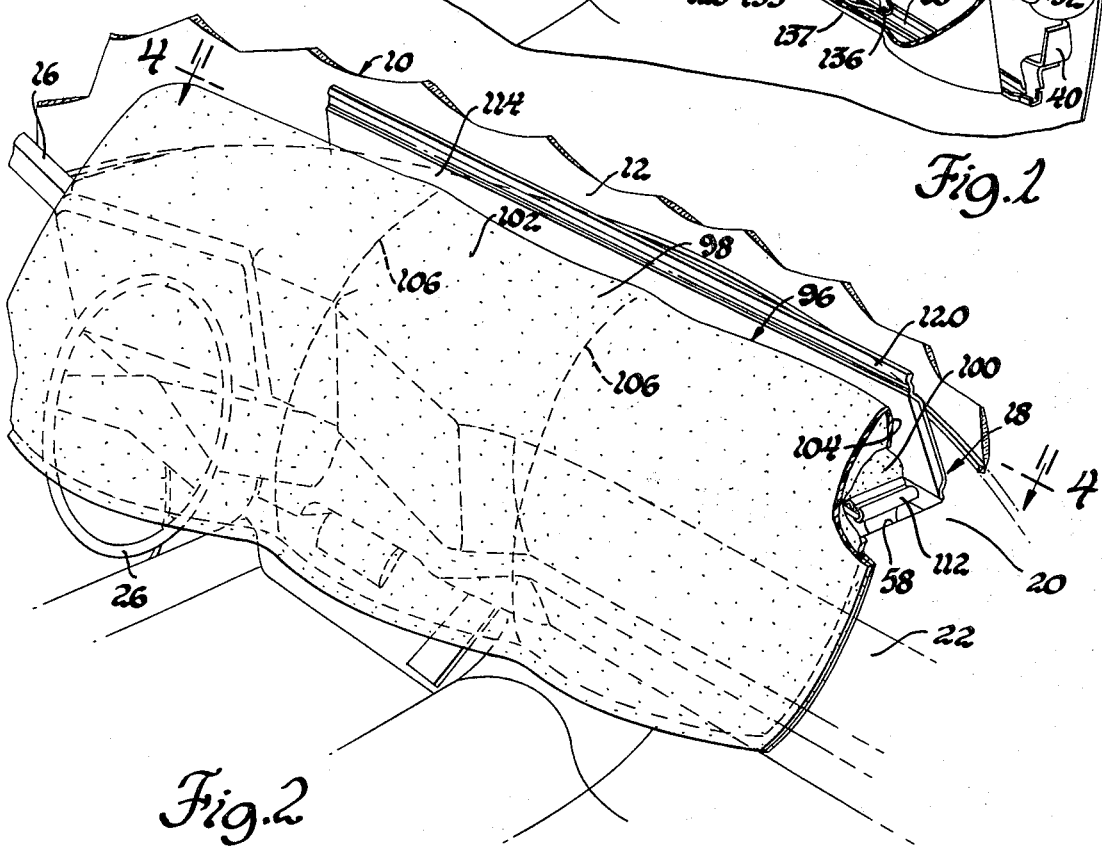
FIG. 2 is a view similar to FIG. 1 showing the cushion inflated.
Figure 4:
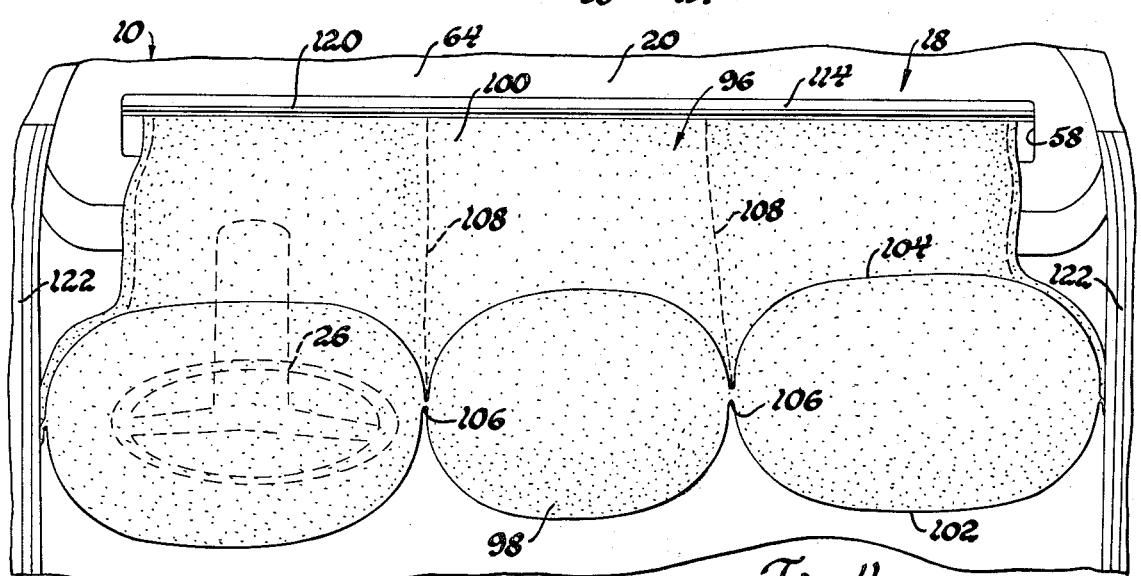
FIG. 4 is a view taken generally along the plane indicated by line 4—4 of FIG. 2.

Referring now particularly to FIGS. 2, 4 and 8, an occupant restraint cushion designated generally 96 includes a pillow portion 98 and an umbilical portion 100. The pillow portion 96 is of generally elongated cross section and includes forward and rearward walls 102 and 104, respectively. The pillow portion may be conveniently formed by folding a sheet of suitable material upon itself to provide an envelope and then stitching this envelope at its side edges to provide the side edges of the pillow portion and at its end edges to provide either the lower edge of the pillow portion as shown in FIG. 8, or the upper edge thereof. The envelope is further stitched intermediate its side edges at 106 to thereby provide the pillow portion with three inflatable compartments which do not cross communicate with each other.

The umbilical portion 100 may likewise be formed by folding a sheet of material upon itself to provide an envelope. The end edges of the envelope may be stitched to each other to provide the left-hand side edge of the umbilical portion as shown in FIG. 8. One of the open side edges of the umbilical portion is suitably secured to the rear wall 104 of the pillow portion around openings therein so that the umbilical portion communicates with the pillow portion. The umbilical portion is further transversely stitched intermediate its side edges at 108 in alignment with stitching 106 so that it likewise is divided into three compartments which communicate with respective compartments of the pillow portion. Both the umbilical portion and pillow portion may be conveniently formed of neoprene-coated dacron material which is substantially nonporous. It can be seen from FIG. 8 that the pillow portion extends peripherally beyond the umbilical portion on all side thereof.

The other open side edge 110 of the umbilical portion is received over the flanges 52 of the side walls 50 and the flanges 56 of the end walls 54 of the manifold and suitably secured thereto such as by clips 112 to communicate the cushion with the diffuser 78 through the manifold 46.

When the cushion 96 is uninflated, those portions of the pillow portion which extend peripherally beyond the sides of the umbilical portion are folded over the pillow portion, the pillow portion folded downwardly under the umbilical portion, the cushion rolled downwardly upon itself, and the roll then placed in the manifold 46 as shown in FIG. 3.

A cover 114 for the opening 58 may be conveniently formed of a foam pad 116, FIG. 3, which is received within the opening and seats on flanges 52 and 56. The foam pad is covered by decorative material or covering 118 which is the same as the covering 64. The covering 118 extends peripherally beyond the pad 116 and the flanges 120 thereof are clamped between the base 60 and the clips 112 to removably secure the cover 114 in place.

When the gas generator 94 receives a suitable signal and is ignited, the pressure fluid flow from the gas generator to the diffuser 78. The fluid expands the diffuser from its oval shape as shown in FIG. 3 to a generally circular shape as indicated in dash lines therein. The diffuser will only assume this generally circular shape between its right-hand and its interfitting ends 86 and likewise between these interfitting ends and its left-hand end wall. As the diffuser assumes this shape, it can be seen with reference to FIG. 3 that the slots 80 are relocated so that they assume the proper position to direct the flow of pressure fluid from the diffuser generally rearwardly and upwardly of the body, between the upper portion 20 of the instrument panel and the windshield 12, rather than directing the flow generally upwardly of the body toward the windshield as they would if they were not relocated.

As the pressure fluid escapes from the slots 80, it partially inflates and unrolls the rolled cushion 96 upwardly and rearwardly of the body against the rear portion of the cover 114. The rear and side flanges 120 of the cover are pulled out from between the metal base 60 of the upper portion of the instrument panel and the clips 112 so that the cover swings forwardly of the body about its forward flange 120 to its position shown in FIG. 2. The cushion 96 then begins to unroll along the upper portion of the instrument panel, between the windshield and this portion as the umbilical portion becomes fully inflated by the pressure fluid and extends beyond the frontal portion 22 of the instrument panel as shown in FIG. 4. When the umbilical portion is substantially fully inflated, the pillow portion then becomes inflated and is erected generally vertically of the body rearwardly of the frontal portion 22 of the instrument panel and rearwardly of the steering wheel 26.

It will be noted with reference to FIG. 4 that the umbilical portion is tapered longitudinally thereof and transversely of the body, the edge of this portion secured to the pillow portion being angular to the open edge 110 which is secured to the manifold. This tapering of the umbilical portion locates the pillow portion angularly of the body, transversely thereof, so that the right-hand side of the pillow portion is located adjacent the right-hand side of the frontal portion 22 of the instrument panel, while the left-hand side thereof is located adjacent the steering wheel 26.

The pillow portion 98 extends generally upwardly to the windshield header of the body, generally downwardly over the frontal portion 22 of the instrument panel, and generally sidewardly to the doors 122 of the body as shown in FIG. 4. The pillow portion is thus erected in a position intermediate the front seat occupants and the windshield, the instrument panel, the pillars 16, and steering wheel 26 for engagement by the heads and upper torsos of such occupants. The pillow portion 98 extends peripherally beyond the umbilical portion as previously noted with reference to FIGS. 4 and 7 so as to cover the aforenoted interior areas and components of the body. The extent of the umbilical portion transversely of the body is limited by the curvature of the windshield 12 since the manifold 46 is located well forward of the upper portion of the instrument panel and adjacent the lower edge of the windshield. The manifold is located immediately rearwardly of the defroster outlets 124, as shown in FIGS. 1 and 3, and these limit its forward location.

With reference to FIGS. 1, 3 and 5, a knee panel 126 extends transversely of the body below the frontal portion 22 of the instrument panel. This knee panel 126 includes a metal base 128 which may be suitably slotted or perforated, as is well known, and covered with crushable foam material 130. An outer decorative covering 132, which may be the same as the coverings 64 and 118, covers the foam material. The upper portion of the knee panel generally follows the contour of the lower edge portion of the frontal portion 22 of the instrument panel.

A strap bracket 133 of generally D shape has its free ends secured at 134 to the rear leg of the tie bar 30. The bracket 132 is further secured at 136 to the base wall of the tie bar 38. The securement 136 also extends through the lower edge portion 137 of the knee panel 126, while the upper edge portion 138 of the knee panel and the lower edge portion 139 of the frontal portion 22 of the instrument panel are secured to each other and to the base of the tie bar 30 generally at 140. The curved portion of bracket 133 backs up the base 128.

An inverted U bracket 141 of channel cross section has its forward leg welded to an offset bracket 142 of channel cross section having a leg 143 welded to the cowl structure 14. The forward leg of the bracket 141 is secured at 144 to the rear leg of the tie bar 30, and this securement also secures the upper end of a strap bracket 146 to the tie bar. The lower bent end of the strap bracket 146, the rearward end of the bracket 142, the lower edge portion 137 of the knee panel and the base wall of tie bar 38 are secured to each other at 148. The upper edge portion 138 of the knee panel, the lower edge portion 139 of the frontal portion 22 and the base wall of the tie bar 30 are further secured to each other at 150. As best shown in FIG. 5, a U bracket 152 straddles the steering column and has its flanged legs secured to the base wall of tie bar 38 and its bight portion secured to the lower edge 137 of the knee panel. The upper edge portion 138 of the knee panel is further secured to the lower edge portion 139 of frontal portion 22 and to tie bar 30 above bracket 152.

The frontal portion 154 of the right-hand side of the knee panel 126 is angled with respect to the frontal surfaces of the knees of the right and center front seat occupants. As these occupants move or slide forwardly relative to the seat and the vehicle upon impact of the vehicle with an obstacle, the upper and lower leg portions of the occupants bend or fold relative to each other and the frontal surfaces of the knees of such occupants engage the frontal portion 154 of the knee panel. This engagement and continued forward movement of the occupants crushes the foam material 130 and deforms the base 128 to absorb part of the kinetic energy of the occupants as well as apply a compressive load along the femurs of the upper leg portions of such occupants. It thus prevents movement of such occupants off the front seat cushion and aids in locating the upper torsos and heads of such occupants for engagement with the pillow portion of the cushion. The foam material 130 may be of any suitable type capable of absorbing part of the energy of impact of the occupants' knees with the panel such that the compressive loading of his femurs is maintained within predetermined limits. It should also be noted that when the material 130 is engaged by the occupants' knees, it deforms and provides pockets which limit movement of the occupants' knees longitudinally thereof or transversely of the vehicle.

Since the cushion 96 is formed of nonporous material, the openings 66 in the forward wall of the manifold 46 and the valves 68 provide a pressure relief means whenever the pressure in the manifold cushion exceeds a predetermined limit due to occupant impact therewith or to excess pressure fluid being available over that required to inflate the cushion. The valve members 68 deflect forwardly of the openings 66 to permit the escape of pressure fluid from such openings through the bellows 72 and thence to the ambient atmosphere. If the openings 66 and valve members 68 communicate with the interior of the passenger compartment, the pressure fluid will, of course, pass thereto rather than to the ambient atmosphere. The pressure relief means also provides the cushion with secondary collision capability since the valve members 68 only open when the pressure within the cushion exceeds the predetermined limit and then close immediately. This is a feature which cannot be obtained from systems using blowout patches or various types of continuous bleed orifices.

It will be noted from the foregoing description that this invention provides a generally T-shaped cushion wherein the pillow portion of the cushion is inflated from an umbilical portion and is erected or positioned generally angularly of the instrument panel so as to be located between the front seat occupants and both the steering wheel and the instrument panel. The diffuser communicates with the cushion through the manifold rather than directly as in many prior art restraint cushion systems. The umbilical portion permits the cushion to be mounted well forward on the upper portion of the instrument panel and adjacent the windshield while still permitting the pillow portion to be erected in a proper position between the front seat occupants and the instrument panel, the steering wheel, and the A pillars. The knee panel 126 properly locates the front seat occupants for effective engagement with the pillow portion while absorbing part of the energy of such occupants and applying compressive loads along the upper leg portions of such occupants within predetermined limits to reduce the possibility of injury to such leg portions.

As is well known, certain vehicles do not include a full bench-type front seat but include bucket seats instead. In such a vehicle, the cushion of this invention can be split into two parts, one for the right-hand front seat passenger and one for the driver. In such instance, neither cushion may be located angularly to the instrument panel if so desired. Likewise such a system can be used, if desired, with a bench seat or only one such cushion may be used.

Thus, this invention provides an improved vehicle body occupant restraint system.

We claim:

1. The combination comprising, a vehicle body having an instrument panel including a generally transversely extending upper portion having a forward periphery of generally U shape, a generally T-shaped inflatable occupant restraint cushion including an elongate umbilical portion and a pillow portion located laterally of the umbilical portion, and means mounting the umbilical portion on the upper portion of the instrument panel in chordal relationship to the bight portion of the periphery thereof, the umbilical portion having a lesser extent transversely of the body than the upper portion of the instrument panel and extending rearwardly thereof, the pillow portion being located rearwardly of the upper portion of the instrument panel generally vertically of the body and having an extent transversely of the body generally equal to that of the upper portion of the instrument panel.

2. The combination comprising, a vehicle body having an instrument panel including a rearward portion and an upper portion, a generally T-shaped inflatable occupant restraint cushion including an umbilical portion and a pillow portion, means mounting the forward terminus of the umbilical portion on the upper portion of the instrument panel, the umbilical portion extending rearwardly of the upper portion of the instrument panel and having the rearward terminus thereof located angularly to the rearward portion of the instrument panel and secured to the pillow portion, the pillow portion being thus located angularly of the rearward portion of the instrument panel and generally vertically of the body.

3. The combination comprising, a vehicle body having an instrument panel including an upper portion, a rearward portion and a steering wheel located adjacent the rearward portion to one side of the body, a generally T-shaped inflatable occupant restraint cushion including an umbilical portion and a pillow portion, means mounting the forward terminus of the umbilical portion on the upper portion of the instrument panel, the umbilical portion extending rearwardly of the upper portion of the instrument panel and having the rearward terminus thereof located angularly to the rearward portion of the instrument panel and secured to the pillow portion, the pillow portion being thus located angularly of the rearward portion of the instrument panel and rearwardly of the steering wheel generally vertically of the body.

4. The combination comprising, a vehicle body having an instrument panel including a rearward portion and an upper portion having a forward periphery of generally U shape and provided with an opening therein in generally chordal relationship to the bight portion of the periphery thereof, a generally T-shaped inflatable occupant restraint cushion including an umbilical portion and a pillow portion located laterally of the umbilical portion, the cushion being normally deflated and stored within the opening of the upper portion of the instrument panel, and means for inflating the cushion to extend the umbilical portion rearwardly of the body over the upper portion of the instrument panel and locate the pillow portion generally vertically of the body and rearwardly of the upper portion of the instrument panel and the rearward portion of the instrument panel.

5. The combination comprising, a vehicle body having an instrument panel including a rearward portion and an upper portion having a forward periphery of generally U shape and provided with an opening therein in generally chordal relationship to the bight portion of the periphery thereof, a generally T-shaped inflatable occupant restraint cushion including an elongate umbilical portion and a pillow portion located laterally of the umbilical portion, the cushion being normally deflated and stored within the openings of the upper portion of the instrument panel, means for inflating the cushion to extend the umbilical portion rearwardly of the body over the upper portion of the instrument panel and locate the pillow portion generally vertically of the body and rearwardly of the upper portion of the instrument panel and the rearward portion of the instrument panel for engagement by the upper portion of an occupant of the body, and an energy absorbing knee panel mounted on the rearward portion and located below the pillow portion for engagement by the knees of the occupant.

* * * * *